United States Patent
Callway et al.

(10) Patent No.: US 6,807,311 B1
(45) Date of Patent: Oct. 19, 2004

(54) METHOD AND APPARATUS FOR COMPRESSING AND STORING IMAGE DATA

(75) Inventors: Edward G. Callway, Toronto (CA); Oscar Y. C. Chiu, Markham (CA); Paul Chow, Richmond Hill (CA)

(73) Assignee: ATI International SRL, Christchurch (BB)

( * ) Notice: Subject to any disclaimer, the term of this patent is extended or adjusted under 35 U.S.C. 154(b) by 0 days.

(21) Appl. No.: 09/349,744

(22) Filed: Jul. 8, 1999

(51) Int. Cl.$^7$ .................................................. G06K 9/36
(52) U.S. Cl. ........................................ 382/250; 348/395.1
(58) Field of Search ................................ 382/250, 248, 382/232; 348/395.1, 403.1; 358/426, 261.3, 432, 433, 426.01, 426.06

(56) References Cited

U.S. PATENT DOCUMENTS 5,777,677 A    7/1998   Linzer et al. ............... 348/397

FOREIGN PATENT DOCUMENTS

| DE | 0 687 111 A2 | 6/1995 |
| EP | 0847203 A2 | 6/1998 |
| FR | 2 745679 | 3/1997 |
| WO | WO98/26600 | 6/1998 |
| WO | WO 98/27735 | 6/1998 |

OTHER PUBLICATIONS

European Search Report to Application No. EP 00 30 5695 (European Patent Office) dated Mar. 15, 2002.

*Primary Examiner*—Yon J. Couso
(74) *Attorney, Agent, or Firm*—Vedder, Price, Kaufman & Kammholz, P.C.

(57) ABSTRACT

A method and apparatus for compressing image data for storage in a memory device is presented. This is accomplished by separating the image data into a plurality of pixel sets where each pixel set is of a predetermined pixel set size. A discrete cosine transform is then performed on each of the pixel sets to produce a plurality of transform coefficients. These transform coefficients are then compressed to produce a compressed data set. Compressing the transform coefficients preferably includes determining a coefficient set that includes a portion of the transform coefficients that reasonably approximate the pixel set. These coefficients are then mapped to known ranges such that a limited number of bits can encode values throughout these predetermined ranges. The mapped coefficients resulting from the mapping step are then manipulated to fit within a limited number of bits assigned to each coefficient. The limited number of bits is determined partially based on the coefficient set to be compressed. The manipulation of these mapped coefficients is preferably accomplished by shifting, rounding, and truncating the mapped coefficients. The coefficients resulting from these operations are then packed along with coefficient identifying information to form the compressed data set.

45 Claims, 5 Drawing Sheets

METHOD AND APPARATUS FOR COMPRESSING AND STORING IMAGE DATA

FIELD OF THE INVENTION

The invention relates generally to video data processing and more particularly to a method and apparatus for compressing and storing video data.

BACKGROUND OF THE INVENTION

Video information in digital format is often provided in a manner where subsequent images rely on information provided in previous images. One such video data format is the MPEG format. MPEG includes three different types of frames. I frames are complete frames that include all of the image data required to draw that particular frame. P frames are derivatives of I frames in that they include information that allows for generation of an image based on a previous I frame. B frames are derivatives of at least one of I and P frames in that they include information that may utilize data from one or more I and P frames in order to generate the image associated with the B frame.

In decoding an MPEG data stream, information in I and P frames needs to be stored in memory such that it can be utilized to generate subsequent frame images. In some applications, such as high definition television (HDTV), the amount of memory required to store the frame information can be on the order of eight to sixteen megabytes (Mbytes). The costs associated with storage of the video data are further compounded by the memory bandwidth required to read and write the video data to and from the memory.

Therefore, a need exists for a method and apparatus for storing intermediate images or frames in memory for subsequent use, wherein storage of these intermediate images requires less memory resources in terms of both memory footprint and bandwidth.

DETAILED DESCRIPTION OF A PREFERRED EMBODIMENT OF THE INVENTION

Generally, the present invention provides a method and apparatus for compressing image data for storage in a memory device. This is accomplished by separating the image data into a plurality of pixel sets where each pixel set is of a predetermined pixel set size. A discrete cosine transform is then performed on each of the pixel sets to produce a plurality of transform coefficients. These transform coefficients are then compressed to produce a compressed data set. Compressing the transform coefficients preferably includes determining a coefficient set that includes a portion of the transform coefficients that reasonably approximate the pixel set. These coefficients are then mapped to known ranges such that a limited number of bits can encode values throughout these predetermined ranges. The mapped coefficients resulting from the mapping step are then manipulated to fit within a limited number of bits assigned to each coefficient. The limited number of bits is determined partially based on the coefficient set to be compressed. The manipulation of these mapped coefficients is preferably accomplished by shifting, rounding, and truncating the mapped coefficients. The coefficients resulting from these operations are then packed along with coefficient identifying information to form the compressed data set.

By separating the image data into pixel sets of a known and limited size, memory bandwidth can be conserved when motion compensation vectors that are commonplace in image processing require data to be fetched from memory. Because of the limited size of the pixel sets, large amounts of unneeded data will not be required to be fetched when only a small amount of data in one or more small pixel sets is to be retrieved.

Mapping the coefficients resulting from the discrete cosine transformation to known ranges, which are preferably based on powers of two, enables maximum usage of the limited number of bits available in the final compressed data set. Selection of the appropriate coefficients resulting from the transformation to compress and include within the compressed data set is also an important factor in ensuring efficient use of the limited number of bits in the compressed set.

Once the data has been compressed and stored in memory, decompression simply involves reversing the steps taken to produce the compressed data. By including the compression and decompression circuitry within a memory controller that interfaces with all memory clients that need access to the image data, additional circuitry savings are realized as individual compression and decompression blocks do not have to be included within each of the memory clients.

Figure 1:
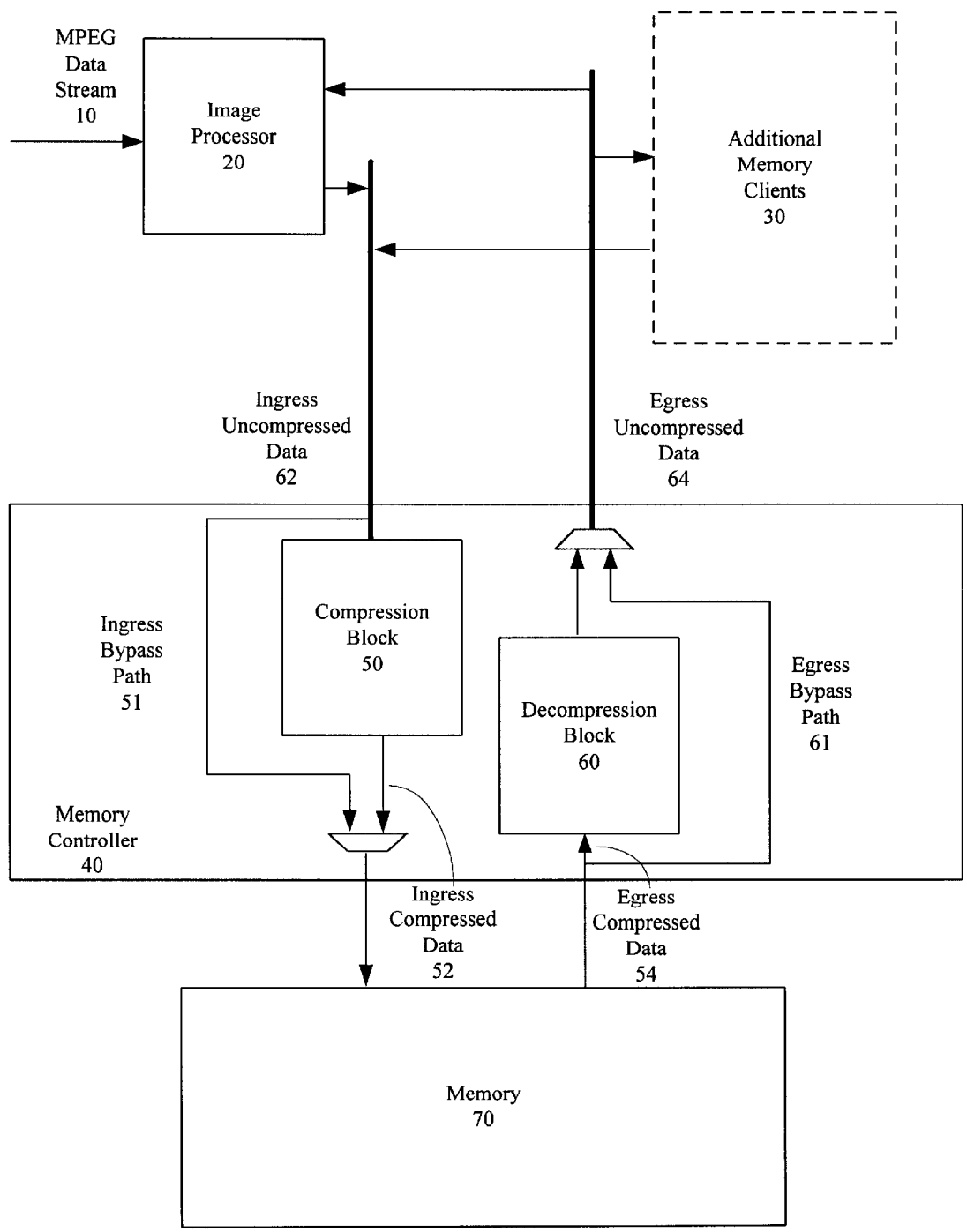
FIG. 1 illustrates a block diagram of a video data circuit in accordance with the present invention.

The invention can be better understood with reference to FIGS. 1–6. FIG. 1 illustrates a block diagram of a video data circuit that includes an image processor 20, additional memory clients 30, a memory controller 40, and a memory 70. The circuit of FIG. 1 includes at least one memory client, which is preferably the image processor 20 that receives an MPEG data stream 10 for processing. Preferably, the MPEG data stream 10 includes image data which will be stored in the memory 70 and then retrieved by the image processor 20 or one or more of the additional memory clients 30 for either display or additional processing. In order to limit the amount of memory required to store these intermediate images, which may be I or P frames in the MPEG data stream, the memory controller 40 includes compression and decompression circuitry.

The memory controller 40 is operably coupled to the image processor 20 and any additional memory clients 30. Typically, the memory controller 40 will be located on the same integrated circuit as the memory clients, including the image processor 20. The memory 70, however, is often located off-chip from the memory clients and the memory controller 40. Thus, the memory 70 may be a discrete integrated circuit. The memory controller 40 is adapted to operably couple to the memory 70 such that data can be exchanged between the memory controller 40 and the memory 70.

The memory controller 40 includes a compression block 50 and a decompression block 60. The compression block 50 receives video data, or image data, for writing operations from one or more of the memory clients 20, 30. Writing operations store video data in the memory 70, whereas reading operations retrieve video data from the memory 70. The compression block 50 receives video data to be written to the memory as ingress uncompressed data 62. The compression block 50 compresses the video data to produce ingress compressed data 52, which is then provided to the memory for storage. Additional details of the compression performed by the compression block 50 are provided in the discussion of FIG. 2 below. Note that an ingress bypass path 51 is also provided that allows any of the memory clients 20, 30 to store information in the memory 70 without any compression being performed.

The decompression block 60 receives compressed video data from the memory 70 as egress compressed data 54. The decompression block 60 reverses the compression process performed by the compression block 50 to produce egress uncompressed data 64, which is then provided to the various memory clients 20, 30. Additional details regarding the decompression block 60 are provided in the discussion of FIG. 3 below. An egress bypass path 61 is provided to facilitate storage of information in the memory in an uncompressed format. The egress bypass path 61 allows memory clients to access the memory 70 without requiring the data to be processed by the decompression block 60. Because the compression and decompression operations are performed completely within the memory controller 40, the memory 70, and the memory clients 20, 30 require no knowledge of the compression and decompression performed within the memory controller 40. Similarly, no additional circuitry is required within the memory clients 20, 30 or the memory 70 to facilitate the compression and decompression operations.

Because video information can be quite sizable, a compression ratio as small as 2:1 can be very beneficial in a video system. These benefits are realized both in terms of limiting of the footprint of the memory 70, and also in reducing the amount of memory bandwidth required to store and fetch the data required to reconstruct images within the data stream.

Figure 2:
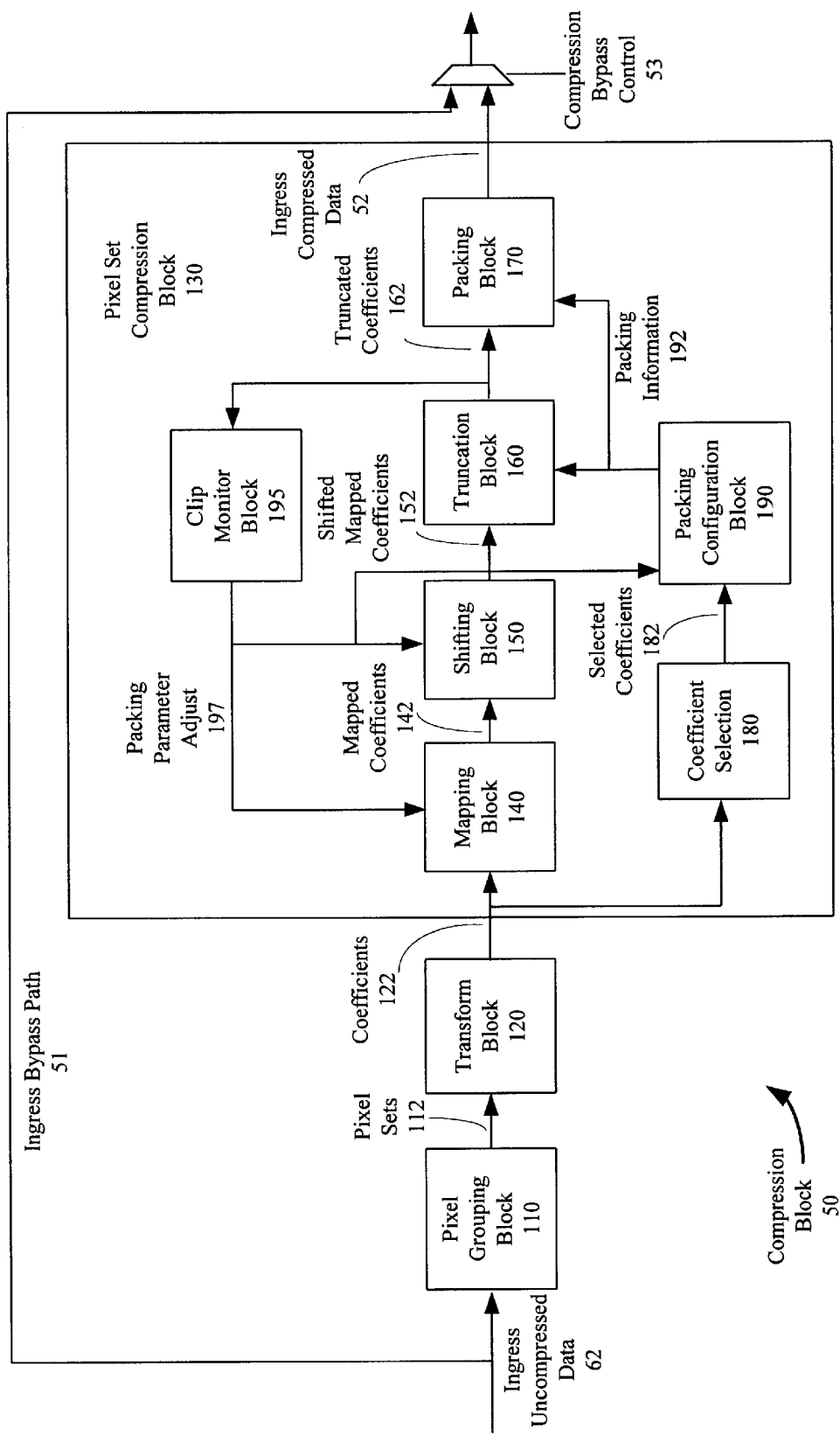
FIG. 2 illustrates a block diagram of an image data compression block in accordance with the present invention.

FIG. 2 illustrates a more detailed view of one embodiment of the compression block 50. The compression block 50 preferably includes a pixel grouping block 110, a transform block 120, and a pixel set compression block 130. The pixel grouping block 110 receives the ingress uncompressed data 62. The ingress-uncompressed data 62 is preferably image data that includes a plurality of pixels. Note that the image data received by the compression block may be one of a variety of different formats, and that MPEG data is not required to realize the benefits of the invention described herein. It should also be noted that within the different video formats, the separate components of the video image data are compressed separately. For example, if the video data is in YUV format, the Y portion will be compressed separately from the U portion, which will be compressed separately from the V portion. This arrangement would also apply to other formats such as YCrCb, RGB, etc.

The pixel-grouping block 110 groups the pixels into pixel sets of a predetermined size. In one embodiment, the predetermined size is an 8-by-1 pixel block that includes eight consecutive horizontal pixels within the image. Small blocks such as the 8-by-1 block may be preferable due to the motion vectors present in a number of video image formats. When data is fetched from the memory for use in calculating image data for a new frame, it is often the case that packing the data based on larger blocks will result in a large amount of unnecessary and unused data be read from the memory. Although larger blocks allow for more efficient and better compression techniques or algorithms, a tradeoff exists between this benefit and the additional bandwidth required to fetch limited amounts of data for processing. Therefore, the preferred embodiment described herein utilizes 8-by-1 pixel sets.

For a single component of the video data, an 8-by-1 pixel set may be represented as 64-bits, where each pixel includes eight bits of data for that video component. If a compression ratio of 2:1 is desired, the 64 bits of information must be reduced to 32 bits. Note that varying levels of compression can be achieved, and a 2:1 compression ratio is selected out of convenience for the specific implementation. A 2:1 compression ratio allows for simple addressing within the memory, and also does not compress the image to the point where the compression compromises image quality significantly.

The pixel sets 112 generated by the pixel-grouping block 110 are provided to a transform block 120. The transform block receives a pixel set and performs a discrete cosine transformation of the pixel set to produce a transform data set that includes a plurality of coefficients 122. Preferably, the discrete cosine transform (DCT) includes eight coefficients that are represented by eight or more bits. More preferably, each coefficient is represented nine or ten bits such that 72 to 80 bits are required to maintain the coefficients at this intermediate stage. The frequency coefficients produced by the DCT accurately represent the information necessary to regenerate the pixels.

The coefficients 122 are then passed to a pixel set compression block 130, which is operably coupled to the transform block 120. The pixel set compression block 130 compresses the coefficients 122 to produce compressed data sets that make up the ingress compressed data 52 provided to the memory 70. The pixel set compression block 130 preferably includes a mapping block 140, a coefficient selection block 180, and a packing block 170.

In order to reduce the number of bits required to accurately represent the coefficients 122 from, in the example system, 72 bits to the 32 bits in the eventual compressed data set, the pixel set compression block 130 takes advantage of inherent characteristics of image data. Images typically include more low-frequency data than high-frequency data. As such, the DC component of the DCT typically requires an accurate representation in a compressed data set in order to ensure the image can be reproduced without degrading visual effects. In contrast, higher frequency coefficients of the DCT often include less data, and therefore a less precise representation of these higher frequency components is less detrimental to reconstructed image quality. Exploiting this characteristic of image data allows for the coefficients 122 to be represented within a limited number of bits that still allow for the image data to be accurately reconstructed with minimal degradation.

In order to maximize the compression while minimizing any potential degradation, each pixel set is treated individually. Thus, the coefficients for a particular pixel set may include almost no high-frequency information, whereas coefficients for another pixel set may include a great deal of high frequency information. By recognizing when less high frequency information is present in a pixel set, the lower frequency portion of the pixel set can be represented much more accurately as the higher frequencies can effectively be ignored or greatly simplified. Similarly, in order to avoid visual artifacts in the reconstructed image, when high frequency information is present in the transform of a pixel set, the limited number of bits can be allocated in a different manner such that some level of preservation is achieved with respect to the high frequency information.

The coefficient selection block 180 determines selected coefficients 182 from the plurality of coefficients 122 produced by the DCT, where the selected coefficients 182 are represented in the compressed data set. The coefficient selection block 180 preferably performs this function based on values of the different coefficients of the DCT. More preferably, the coefficient selection block 180 compares values of the various coefficients with different threshold levels to determine whether or not a coefficient is of a high enough value that it should be included in the selected coefficients 182. Thus, each of the coefficients resulting from the DCT has an associated threshold level that must be exceeded for that particular coefficient to be included in the selected coefficients 182. As stated above, the selected coefficients 182 are the coefficients that will be represented in some manner within the eventual compressed data set. If a coefficient is not included in the selected coefficients 182, no information regarding that coefficient will be included within the compressed data sheet.

Because different pixel sets may be represented using different selected coefficients 182, the compressed data set must include some type of indication as to which coefficients have been included as selected coefficients. In order to accomplish this, a compressed coefficient identifier is included in the compressed data set, where the compressed coefficient identifier identifies which coefficients have been included as selected coefficients within the particular compressed data set.

In order to simplify the determination of the selected coefficients 182 and the representation of the compressed coefficient identifier, one embodiment of the invention selects a highest order coefficient to be included in the selected coefficients 182. This inclusion is regardless of the actual values of lower level coefficients. This simplifies representation of the compressed coefficient identifier by allowing for a single highest order coefficient to be identified as the decompression circuitry will know that all coefficients of a lower order than this highest order coefficient are included in the selected coefficients 182.

In an example embodiment where eight potential coefficients are present, three bits would be required to identify any one of the eight potential coefficients as the highest order coefficient. However, the three bits required can be reduced to two bits by recognizing that in many cases at least four coefficients will be maintained within the selected coefficient set 182. Thus, two bits can define a range between the fourth coefficient and the seventh coefficient such that any coefficient within that range can be identified as the highest order coefficient. Thus, a 00 may represent that coefficient 4 is the highest order coefficient, whereas 11 indicates that coefficient 7 is the highest order coefficient. Note that this assumes that the eighth coefficient is always ignored. Simulations have shown that ignoring the eighth coefficient does not cause serious degradation in most reconstructed images.

In order to determine the highest order coefficient to be included in the selected coefficients 182, the coefficient selection block 180 can compare the potential highest order coefficients (in the example, coefficients 4–7) with different threshold values to determine the highest order coefficient. More preferably, the highest order coefficient is determined to be the highest order coefficient, which would have a non-zero representation within the compressed data set. Thus, prior to performing the mapping and packing function which will be discussed immediately below, the coefficient selection block 180 can determine what value a coefficient must have in order to require a non-zero representation in the compressed data set. For example, it can be determined that when coefficient seven is mapped and packed in such a way that when the absolute value of the coefficient is less than 15, the resulting mapped and packed representation will be zero. As such, the coefficient selection block 180 will determine that coefficient seven will not be included in the selected coefficients 182 if its absolute value is less than 15. If, however, coefficient six exceeds its threshold value for non-zero representation in the compressed data set, coefficient six and all lower order coefficients will be included in the set of selected coefficients 182.

In other embodiments of the invention, coefficient selection may be performed in a more elaborate manner that considers the magnitudes of the various coefficients in more detail. For example, even though there may be enough information in coefficient six to meet the threshold requirements, coefficients four and five may be negligible in terms of their relevance to reconstruction of the pixel set being compressed. In such an instance, it may be preferable to discard the fourth and fifth coefficients, and utilize the limited bits available to better compress the more significant sixth coefficient. The additional bits available for sixth coefficient may prevent clipping of this coefficient, resulting in less information loss in the compressed set. Thus, a more extensive examination of the DCT coefficients may be performed to determine the final set of selected coefficients.

By determining which coefficients to keep or maintain within the compressed data set based on the high frequency information included in the DCT, some level of compression has already been achieved. However, reducing 72 bits to 32 bits as in the example has obviously not yet been achieved. In order to maximize the usage of the limited bits space available, each of the coefficients to be represented in the compressed data set is mapped to known ranges based on predetermined functions. Each of the coefficients other than the DC, or zero, coefficient in the DCT represents a change or deviation from the DC coefficient. As such, each of these other coefficients is a positive or negative step. Thus, the representation of the non-DC coefficients require both a sign bit and a value bit. As such, representing a range of −16 to +15 would require 5 bits.

Various functions can be used to map values in a larger range to a smaller range, where when the decompression takes place, an inverse mapping is performed to approximate the original value which was mapped. The preferable function to perform this task is a compand function, where small values within a limited range have a one-to-one mapping, but values above a predetermined breakpoint are mapped based on a line having a slope of one-half. Such compand functions are well known in the audio compression field, as they provide a high level of accuracy for low input values, whereas higher values are encoded with less precision. This mapping through the use of a compand function allows the number of bits required to store a high range of values to be reduced while minimizing the reduction in accuracy.

For example, if the real range of the coefficient is plus or minus 86 and it is desired to map that range to the next lowest power of 2 value, which in this case would be 63, a specific compand function can be tailored to suit these requirements. The real range of a particular coefficient can be estimated by running test cases through a system to determine the maximum value within different images for the various coefficients. Once this has been determined, an appropriate compand function can be established. To map a range of plus or minus 86 to a range of plus or minus 63, a breakpoint of 40 would be appropriate. Thus, for input values having an absolute value between zero and 40, the compand function would map these values with a slope of 1 such that the input value is produced as the output value. For input values greater than 40 (absolute value), the compand function would map the input values to a line having a slope of one-half such that an input value of 86 would be mapped to an output value of 63. Note that this example assumes, for the purposes of calculating slope of the line, that the input values are on the horizontal axis and the output values are on the vertical axis.

If the mapping function were not performed by the mapping block 140, eight bits would be required to store the maximum value of 86 for the particular coefficient. The eight bits would provide a range from −128 to +127, a portion of which would go mostly unused. This assumes that the presence of values having an absolute value between 86 and 127 are rare and not frequent enough to require inclusion in the compressed data sets. By mapping the true range of a coefficient to a smaller $2^n$ range, the eight bits required to fully encode values for the coefficient described in the example above can be reduced to seven bits. This is accomplished with minimum loss of accuracy.

Although the compand function is discussed in great detail, additional embodiments may make use of a multiplier to perform the mapping function. In the example given above, the multiplier may simply multiply the input value by the fraction $63/86$ to generate the appropriate mapped value. However, the compand function is more accurate for lower values, which are present more often, and the multiplier often requires more complex circuitry than that required by the compand function. A compander can be made with a couple of adders, multiplexors, and a comparator which is a small amount of circuitry when compared with that required to produce a eight-by-ten or ten-by-ten linear multiplier.

Similarly, the mapping function may be accomplished through the use of a look-up table or some other type of look-up function. Such a look-up function would employ a large array of output values that would be provided in response to the received input values. Although the look-up table provides additional flexibility, the complexity and amount of hardware required to implement it is undesirable. It should be apparent to one of ordinary skill in the art that a number of different mapping circuits could be produced to achieve the functionality of the mapping block 140.

Once the selected coefficients 182 have been determined and the mapping block 140 has mapped the received coefficients 122 to produce the mapped coefficients 142, it must be determined how many bits to include in the compressed data set on a coefficient-by-coefficient basis. Thus, one may decide to maintain full resolution with respect to the DC coefficient, and leave fewer bits per coefficient for higher level coefficients. Preferably, this is accomplished utilizing the packing configuration block 190, which more preferably includes one or more tables. Each row or column of the table corresponds to the number of coefficients included in the selected coefficients 182. Based on the number of coefficients, the table lists the number of bits per coefficient to be maintained in the compressed data set. Thus, one entry in the table may correspond to the case where four coefficients are kept, whereas additional entries correspond to the cases where five, six or seven coefficients are included in the selected coefficients 182.

Returning to the example where the compressed data set includes 32 bits, 30 bits remain for coefficient information after two bits have been allocated for the compressed coefficient identifier, which indicates the selected coefficients 182. Assuming that four coefficients are included in the selected coefficients 182, the 30 bits must be distributed amongst the four different coefficients for packing. One technique to determine the appropriate bit allocation is to take a number of images and compress and decompress them and compare the decompressed images with the original images to determine the root mean square (RMS) error across the image. The bit allocation that produces the lowest RMS error across the image is then selected as the proper bit allocation, or at least the initial bit allocation, to be stored within the packing configuration block 190. Test images have shown that, typically, subsequent coefficients have the same number or fewer bits than previous or lower-order coefficients in the optimal bit configurations. For example, if four coefficients are included in the selected coefficients 182, the DC coefficient may be maintained at full resolution such that nine bits are required to represent the DC coefficient. The next three coefficients are allocated eight, seven and six bits, respectively, such that the total number of bits allocated to the four coefficients is 30. Combining these 30 bits with the two bits required to indicate the selected coefficients results in the 32-bit compressed data set.

In another embodiment, the table may store multiple bit allocations for a certain number of selected coefficients. For example, there may be a five coefficient case that provides coefficient four with X bits and coefficient three with Y bits. Another five coefficient case might provide (X−2) bits for coefficient four (Y+2) bits for coefficient three. The decision as to which case to use is preferably based on the magnitudes of each of the coefficients such that the bits available are best utilized. The bits available to indicate the number of coefficients in the selected set can be utilized to distinguish between the different cases of bit allocations. (e.g. '00' indicates four coefficients, '01' indicates the first five coefficient case, '10' indicates the second five coefficient case, and '11' indicates six coefficients) In order to reduce the mapped coefficients 142 to the number of bits allocated for each particular coefficient, a shifting block 150 and a truncation block 160 are preferably employed. The shifting block 150 receives the mapped coefficient 142 from the mapping block 140 and shifts the mapped coefficients 142 such that lower order bits are shifted into higher order bit locations to produce shifted mapped coefficient 152. Note that because the majority of the coefficients are positive or negative values, the shifting block 150 must perform sign extension. In addition to this consideration ordering of the shifting and mapping blocks can be swapped such that the mapping operation is performed on pre-shifted values.

The shifted mapped coefficients 152 are provided to the truncation block 160 that selects a portion of the shifted map coefficient for inclusion in the compressed data set. The truncation block will select a number of bits from each coefficient corresponding to information received from the packing configuration block 190. Preferably, the truncation block 160 performs a rounding function prior to truncating the value of any particular coefficient, as this helps to maintain image quality. The truncation block 160 discards a discard quantity of low order bits of the mapped value equal to the difference between the bit width of the mapped coefficient and the bit width allocated to that coefficient in the compressed data set.

Thus, the shifting block 150 positions the mapped coefficients in preparation for truncation in the truncation block

160. The truncation block 160 produces truncated coefficients of the correct bit length for packing into the compressed data set. The truncated coefficients 162 are then provided to the packing block 170. The packing block 170 packs the truncated coefficients corresponding to the selected coefficients 182 along with the compressed coefficient identifier to produce compressed data sets to be included in the ingress compressed data 52. The packing block 170 performs this packing based on the packing information 192 received from the packing configuration block 190.

In order to allow the pixel set compress block 130 to adapt to the images which it is compressing, the pixel compression block 130 may further include a clip monitor block 195. The clip monitor block 195 is operably coupled to the truncation block 160, the mapping block 140, the shifting block 150, and the packing configuration block 190. The clip monitor block 195 adjusts the packing parameters based on clip occurrences in the truncated coefficients 162. Thus, the clip monitor block 195 will monitor the truncated coefficients 162 and determine when various coefficients are clipped or restricted in terms of their maximum value in the compressed data set.

The clip monitor block 195 may include a number of counters that count the occurrences of clipping for particular coefficients. These counters can then be monitored to determine the frequency of clipping for a particular image. If the clipping is found to be excessive, packing parameter adjust information 197 can be provided to the mapping block 140, the shifting block 150 and the packing configuration block 190 to adapt the packing parameters or mapping and shifting functions to better suit the image data being compressed. Thus, the packing parameter adjust signals 197 may in one instance move the compand point within a compand function to allow for a higher range of values to be mapped to the predetermined range. Similarly, they can adjust the shifting performed by the shifting block, or reallocate bits within the compressed data set through the packing configuration block 190.

In order to allow accurate decompression of the compressed data, the packing configuration block 190 must be able to provide the particular packing information associated with an image to the decompression block for decompression. If a clip monitor block 195 is included in the system that allows the packing scheme to be adjusted, registers or other forms of data storage must be included in the system such that different packing schemes associated with different images or frames are monitored. Thus, an image may include a tag indicating where the particular packing information for that image is stored.

Note that FIG. 2 includes the ingress bypass path 51 that allows the compression operations performed by the compression block 50 to be bypassed. A multiplexer or other device could be used to select between storing compressed data or uncompressed, unaltered data in the memory 70. Control of the selection may be accomplished using a compression bypass control signal 53 as illustrated.

Figure 3:
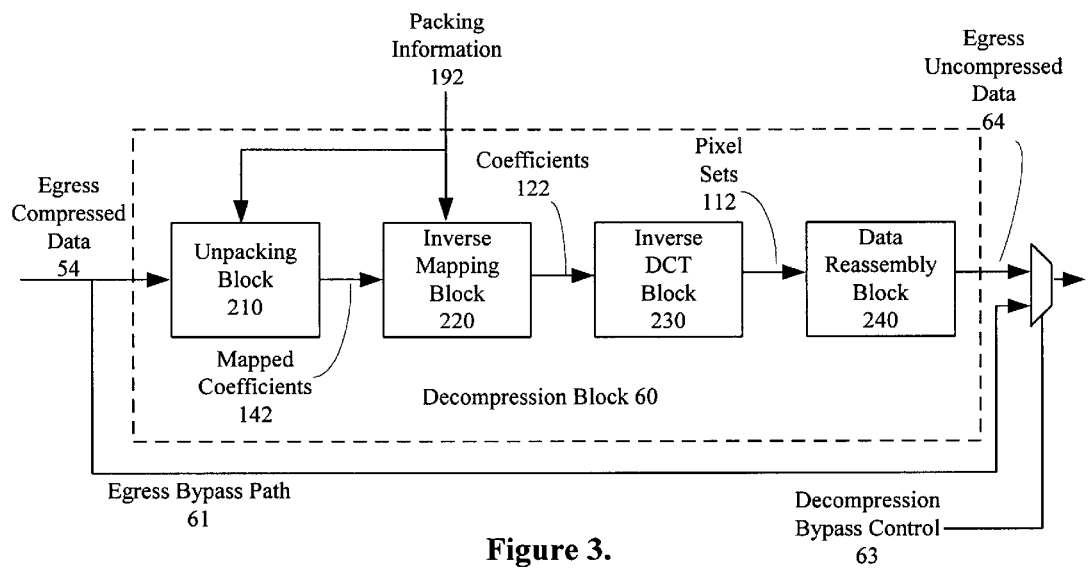
FIG. 3 illustrates a block diagram of an image data decompression block in accordance with the present invention.

FIG. 3 illustrates a more detailed view of the decompression block 60. The decompression block 60 includes an unpacking block 210, an inverse mapping block 220, an inverse transform block 230, and preferably a data reassembly block 240. As described earlier, the egress bypass path 61, which is preferably selected using the decompression bypass control signal 63, is included to allow the decompression operations to be bypassed. The decompression block 60 receives the egress compressed data 54 from the memory 70 and produces egress uncompressed data 64. The egress compressed data 54 is provided to the unpacking block 210 which separates the compressed coefficients based on the coefficient identifier to produce the mapped coefficients 142. Note that if the compression involved shifting and truncation, the inverse truncation and shifting blocks will also be included in the unpacking block 210. In order to facilitate unpacking of the egress compressed data 54, the packing block 170 of FIG. 2 preferably packs the various coefficient data in a predetermined order. As such, the first portion of the egress compressed data 54 may be the compressed coefficient identifier, which allows the unpacking blocks 210 to accurately identify and unpack the various coefficients included in the data set.

The inverse mapping block 220 performs the opposite function of the mapping block 140 in that it takes the mapped coefficients 142 and "unmaps" them to their original range. Therefore, the function of the inverse mapping block 220 is to map the mapped coefficients 142 to an inverse mapping function to produce the original plurality of coefficients 122. Note that the unpacking block 210 and the inverse mapping block 220 receive packing information 192 from the packing configuration block 190 of FIG. 2 to facilitate the inverse packing and mapping functions.

The original coefficients are then reassembled and provided to the inverse transform block 230, which performs an inverse discrete cosine transform on the plurality of coefficients 122 to produce a pixel set 112. Note that if all of the coefficients are not included in the compressed data set, the inverse transform block must assume absent values are zero when it performs the inverse DCT. Finally, the data reassembly block 240 receives the various pixel sets 112 and reassembles then to produce the image data desired by the memory client.

Figure 4:
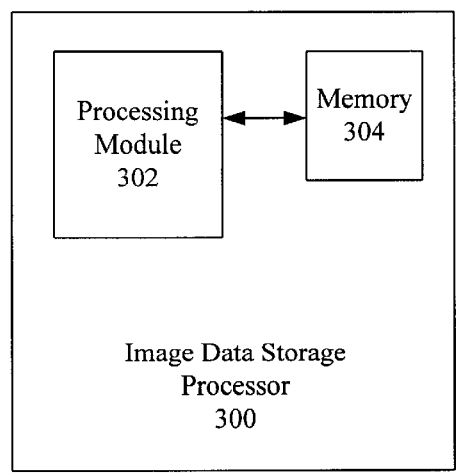
FIG. 4 illustrates a block diagram of an image data storage processor in accordance with the present invention.
Figure 5:
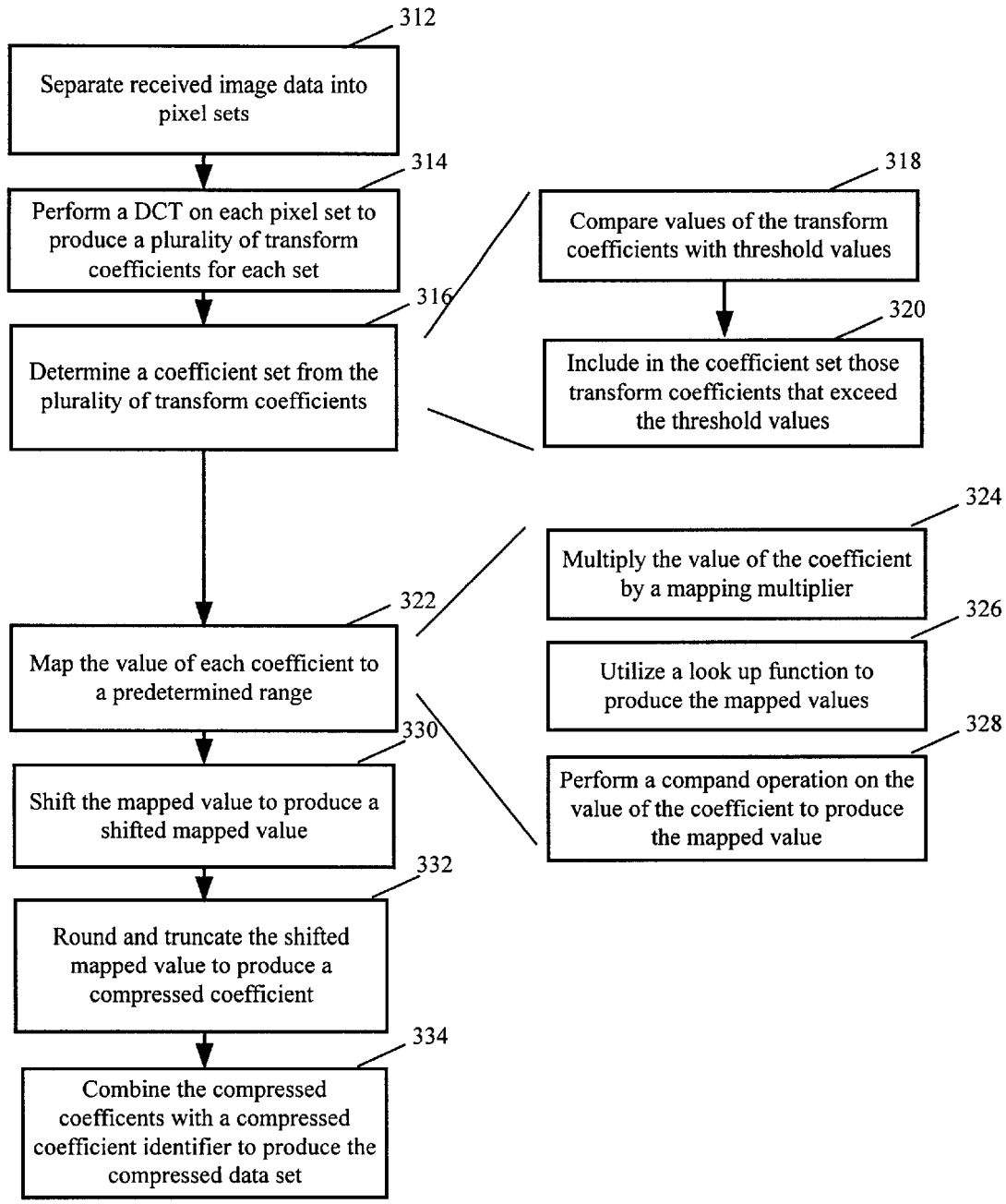
FIG. 5 illustrates a flow diagram of a method for compressing image data in accordance with the present invention.
Figure 6:
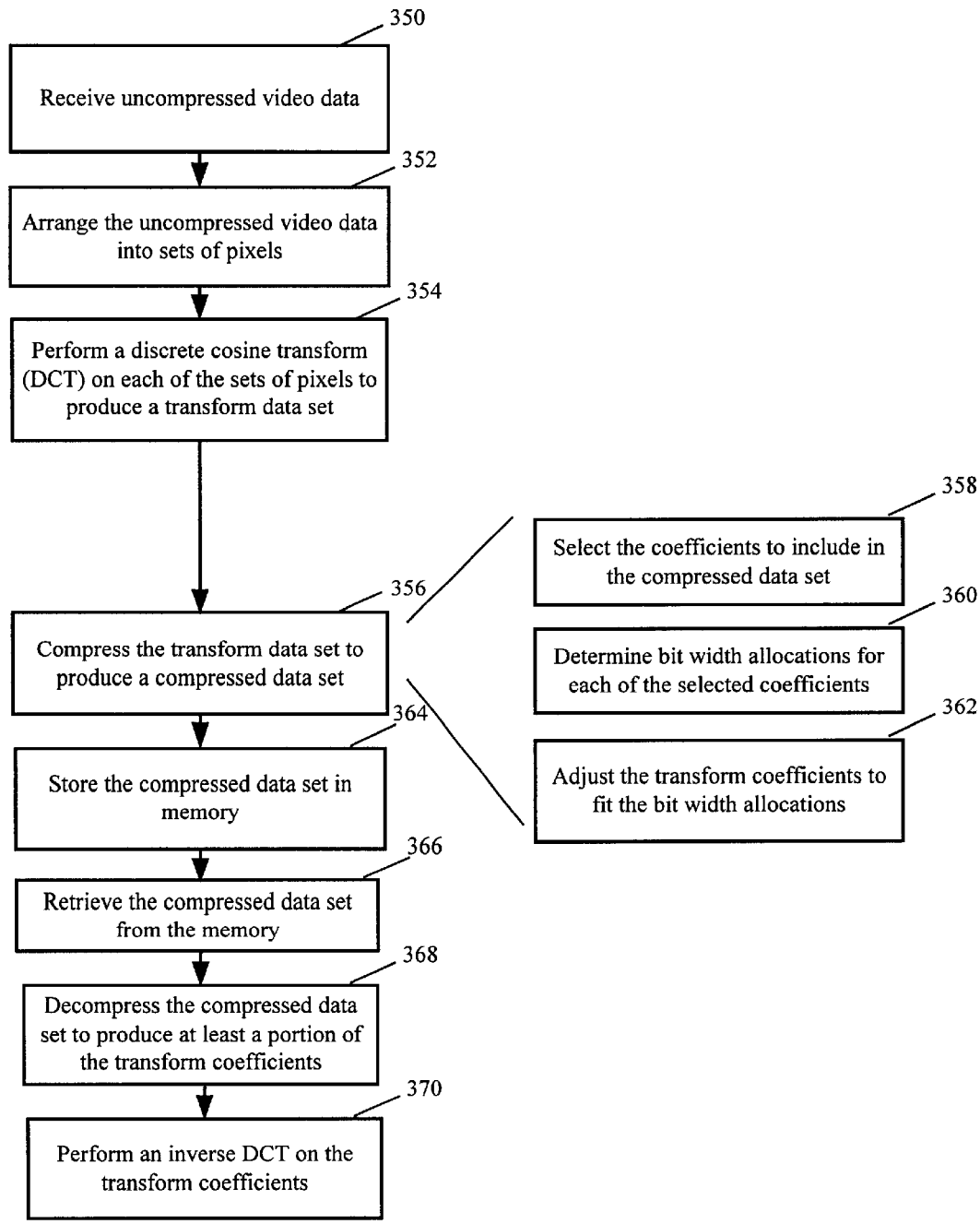
FIG. 6 illustrates a flow diagram of a method for storing and retrieving video data in accordance with the present invention.

FIGS. 5 and 6 illustrate methods for compressing image data and storing and retrieving video data, both of which may be performed using various combinations of hardware and software. Thus, some of the functions included in the methods of FIGS. 5 and 6 may be performed through simple hardware implementations, whereas other portions are performed by a processor executing operational instructions. Alternatively, the entire methodology presented in these figures may be performed using a processor such as that illustrated in FIG. 4.

FIG. 4 illustrates an image data storage processor 300 that includes a processing module 302 and a memory 304. The processing module 302 may include a single processing entity or a plurality of processing entities. Such a processing entity may be a microprocessor, microcontroller, digital signal processor, state machine, logic circuitry, and/or any device that processes information based on operational and/or programming instructions. The memory 304 may be a single memory device or a plurality of memory devices. Such a memory device may be a read-only memory device, random access memory device, floppy disk, hard drive memory, and/or any device that stores digital information. Note that when the processing module 302 has one or more of its functions performed by a state machine and/or logic circuitry. The memory containing the corresponding operation instructions is embedded within the state machine and/or logic circuitry.

The memory 304 stores programming and/or operational instructions that allow the processing module 302 to perform the methods, or portions of the methods, illustrated in FIGS. 5 and 6. FIG. 5 illustrates a flow diagram of a method for compressing image data. The image data may be image data from an MPEG data stream, some other type of video data stream, or still image data. At step 312, the image data is separated into a plurality of pixel sets, where each pixel set is a predetermined pixel set size. In one embodiment, the pixel set size is eight pixels, where the eight pixels make up an eight-by-one pixel block that includes eight consecutive horizontal pixels. In other embodiments, the pixel sets may be made up of a different number of pixels, or the pixels may be vertical consecutive rather than horizontally consecutive.

At step 314, a discrete cosine transform (DCT) is performed on each of the pixel sets to produce a plurality of transform coefficients. The DCT results in transform coefficients that include a DC coefficient, which preferably has a value ranging between 0 and 511, and a number of additional coefficients that indicate deviation from the DC value. Preferably, each of the additional coefficients is a signed number, which can range from between −256 and +255. Note that the numbers indicated for the coefficients are merely for illustrative purposes. The remaining steps act to compress these transform coefficients for each pixel set to produce a compressed data set for each pixel set. The compressed data set for each pixel set will be of a predetermined compressed data set size that is less the pixel set size. In one embodiment, the pixel set size is 64 bits, corresponding to eight bits for eight pixels. In such an embodiment, if the compression ration is 2:1, the compressed data set size for each pixel set will be 32 bits.

At step 316, a coefficient set is determined. The coefficient set indicates which of the transform coefficients resulting from the DCT will be represented in the compressed data set. This step takes advantage of the fact that not all of the coefficients resulting from the DCT will have significant values, and selects those that have the most impact on the decompression steps that will have to be performed in order to recreate the uncompressed information from the compressed data set. The determination of the coefficient set may be performed as shown in steps 318 and 320, where values of the transform coefficients are compared with threshold values. Once the comparison has been performed, those transform coefficients that exceed these threshold values will be included in the coefficient set, as indicated as step 320.

In another embodiment, a highest order selected coefficient is determined based on the highest order coefficient to exceed its threshold value. The coefficients to be included in the coefficient set are then determined based on this selected highest order coefficient. Coefficients of a lower order as compared to the selected highest order coefficient are included in the coefficient set along with the selected higher order coefficient. Thus, if the sixth coefficient is found to be the highest order coefficient that exceeds the threshold value, all the coefficients up to and including the sixth coefficient will be included in the coefficient set. Preferably, the threshold values are determined as described earlier with respect to FIG. 2.

At step 322, the value of each coefficient is mapped to a predetermined range. The mapping performed at step 322 allows coefficients of an arbitrary range to be mapped to a well understood predetermined range that is preferably based on a plus-or-minus $2^N$ range. This allows values within the range to be easily encoded using N+1 bits, and insures that the entire range provided by these N+1 bits is fully utilized.

The mapping performed at step 322 may be performed in a number of different ways. At step 324, the mapping is accomplished simply by multiplying the value of the coefficient by a mapping multiplier to produce a mapped value within the predetermined range. At step 326, a look-up function is used to produce the mapped value from the value of the coefficient. At step 328, a compand operation is used to produce the mapped value from the coefficient value. The methods utilized to perform this mapping function were described earlier with respect to the mapping block 140 of FIG. 2.

At step 330, the mapped value is shifted in such a manner that the sign of the mapped value is preserved with respect to signed coefficients. The shifting performed at step 330 positions the relevant bits within the mapped value appropriately for step 322 where the shifted values are rounded and truncated. Note that the rounding prior to truncation is merely to help preserve additional image quality, and simple truncation could be substituted with some additional information loss. The truncation performed at step 332 discards a quantity of low order bits of the mapped value to produce a compressed coefficient for the particular coefficient. The discard quantity, or number of low order bits that are discarded is equal to a difference between the bit width of the mapped value for the coefficient and the bit width allowed for the compressed coefficient in the compressed data set. The appropriate bit width for each of the coefficients is determined based on which coefficients are included in the compressed data set. Preferably, these bit widths are stored in an array of tables that can be referenced based on the coefficients included in a compressed data set.

At step 334, the compressed coefficients are combined with a compressed coefficient identifier to produce the compressed data set. The compressed coefficient identifier indicates which coefficients are represented in the compressed data set, and is preferably encoded as described with respect to FIG. 2. Such a compressed coefficient identifier is preferably an R-bit identifier where R is a number. The R-bit identifier identifies a highest order coefficient in a $2^R$ range of coefficients. The highest order coefficient and lower order coefficients are then known to be included in the coefficient set. This information allows a decompression algorithm to both determine the coefficients represented, and also, through use of the look-up tables used in truncation step, to understand the bit widths of each of the coefficients.

The method of FIG. 5 allows image data to be compressed in an efficient manner that minimizes loss of information through the compression. This is generally accomplished by separating the image data into fixed size pixel sets which are limited in their size to insure that memory bandwidth is not wasted by retrieving much larger blocks than are required by motion vectors often included in video data streams. The discrete cosine transform then provides a frequency representation of each of the pixel sets. The coefficients included in this frequency information are then studied to determine which coefficients should be kept to insure maximum data retention. Once this has been determined, these coefficients are packed into a limited bit space provided in the compressed data set. Such an implementation can greatly reduce memory and memory bandwidth requirements in video circuits.

FIG. 6 illustrates a flow diagram of a method for storing and retrieving video data in a system similar to that illustrated in FIG. 1. At step 350, uncompressed video data to be stored is received. At step 352, the uncompressed video data is arranged in sets of pixels of a predetermined size.

At step 354, a DCT is performed on the sets to produce coefficients for each of the sets of pixels. At step 356, the coefficients are compressed to produce compressed data. Preferably, step 356 is performed as illustrated in steps 358–362. At step 358, a subset of the coefficients is selected for compressing based on the values of the coefficients. At step 360, appropriate bit widths for each coefficient to be included in the compressed data are determined. These bit widths are preferably determined based on which coefficients are included in the compressed version of the pixel set. For example, a certain set of bit widths is assigned to the coefficients when five coefficients are maintained, whereas different bit widths will be assigned when six coefficients are maintained.

At step 362, the coefficients to be compressed are adjusted to fit within the bit widths determined at step 360. Step 362 can be include mapping values of the coefficients to predetermined ranges corresponding to each coefficient to facilitate maximum usage of the ranges provided by the limited number of bits. At step 364, the compressed data is stored in memory.

At step 366, at least a portion of the compressed data that has been stored in memory is retrieved. Thus, although an entire image may be compressed and stored within the memory, small portions or individual sets of pixels may be retrieved as required due to motion vectors or other considerations in the video processing application.

At step 368, the compressed data retrieved from memory is decompressed to produce at least a portion of the coefficients. Thus, if four coefficients were included in the compressed data set, the decompression step 368 will return at least approximations of these four coefficients. The decompression step 368 also must reverse any adjustment or manipulation performed on these coefficients prior to their inclusion in the compressed data set.

At step 370, an inverse DCT is performed on the coefficients which have been decompressed at 368 along with any zero filling that must be included to ensure proper operation of the inverse DCT. The result of the inverse DCT is a pixel set corresponding to compressed data retrieved at step 366.

The method of FIG. 6 illustrates how the compression technique shown in FIG. 5 can be utilized to store and retrieve data from a memory structure in conjunction with a video processing or other video image storage system. Such compression techniques may further include optimizations that allow for adjustment of the compression and decompression parameters based on image content. If such adapted techniques are employed, registers may be included such that the particular compression scheme utilized to store an image or portion of an image in memory is indicated within a register. When decompression of portions of these images has been performed, the registers can be referenced to determine the exact parameters or configuration utilized to compress the data and the decompression techniques can be adapted accordingly.

It should be understood that the implementation of other variations and modifications of the invention in its various aspects should be apparent to those of ordinary skill in the art, and that the invention is not limited to the specific embodiments described. It is therefore contemplated to cover by the present invention any and all modifications, variations, or equivalents that fall within the spirit and scope of the basic underlying principals disclosed and claimed herein.

What is claimed is:

1. A method for compressing image data comprising:
    separating the image data into a plurality of pixel sets, wherein each pixel set is a predetermined pixel set size; and
    for each pixel set of the plurality of pixel sets:
        performing a discrete cosine transformation of the pixel set to produce a plurality of transform coefficients; and
        compressing the transform coefficients for the pixel set to produce a compressed data set, wherein the compressed data set is a predetermined compressed data set size, wherein the compressed data set size is less than the pixel set size, wherein compressing further comprises:
            determining a coefficient set, wherein the coefficient set indicates which of the transform coefficients are represented in the compressed data set;
            compressing values corresponding to coefficients included in the coefficient set to produce compressed coefficients; and
            combining the compressed coefficients to produce the compressed data set.

2. The method of claim 1, wherein the pixel set size is twice as large at the compressed data set size.

3. The method of claim 1, wherein combining further comprises combining the compressed coefficients with a compressed coefficient identifier to produce the compressed set, wherein the compressed coefficient identifier identifies the transform coefficients, represented in the compressed set.

4. The method of claim 3, wherein the compressed coefficient identifier is an R-bit identifier, wherein R is a number, wherein the R-bit identifier identifies a highest order coefficient in a $2^R$ range of coefficients, wherein the highest order coefficient and lower order coefficients are included in the coefficient set.

5. The method of claim 3, wherein compressing values further comprises, for each coefficient to be included in the compressed set:
    mapping a value of the coefficient to a predetermined range for the coefficient to produce a mapped value, wherein when a bit width of a compressed coefficient corresponding to the coefficient is equal to a bit width of the mapped value for the coefficient, the mapped value is the compressed coefficient for the coefficient; and
    when the bit width of the compressed coefficient corresponding to the coefficient is less than the bit width of the mapped value for the coefficient, discarding a discard quantity of low order bits of the mapped value to produce the compressed coefficient for the coefficient, wherein the discard quantity is equal to a difference between the bit width of the mapped value for the coefficient and the bit width for the compressed coefficient.

6. The method of claim 5, wherein mapping to a predetermined range further comprises mapping to a predetermined range that corresponds to a power of two such that a set of range bits can be used to represent the mapped value.

7. The method of claim 5, wherein mapping further comprises multiplying the value of the coefficient by a mapping multiplier to produce a mapped value within the predetermined range.

8. The method of claim 5, wherein mapping further comprises utilizing a look up function to produce the mapped value from the value of the coefficient.

9. The method of claim 5, wherein mapping further comprises performing a compand operation on the value of the coefficient to produce the mapped value for the coefficient.

10. The method of claim 5, wherein discarding low order bits of the mapped value further comprises:
    shifting the mapped value such that lower order bits are shifted into higher order bit locations to produce a shifted mapped value; and discarding the discard quantity of low order bits of the shifted mapped value.

11. The method of claim 10 further comprises determining the discard quantity for each compressed coefficient from a selected table, wherein the selected table is selected from a plurality of tables corresponding to a plurality of potential coefficient sets.

12. The method of claim 3, wherein determining the coefficient set further comprises:
comparing values of the transform coefficients with threshold values; and
including in the coefficient set transform coefficients whose values exceed corresponding threshold values.

13. The method of claim 12, wherein comparing values of the transform coefficients further comprises:
comparing values of a predetermined portion of the transform coefficients with the threshold values;
including a highest order coefficient that exceeds a corresponding threshold value in the coefficient set; and
including coefficients of a lower order as compared to the highest order coefficient in the coefficient set.

14. The method of claim 1, wherein the image data is MPEG video data.

15. The method of claim 1, wherein separating further comprises separating the image data into a plurality of 8-by-1 pixel sets, includes eight consecutive horizontal pixels.

16. A method for storing and retrieving video data, comprising:
receiving uncompressed video data for storage;
arranging the uncompressed video data in sets of pixels of a predetermined size;
performing a discrete time transform of the sets to produce coefficients for each of the sets of pixels;
compressing the coefficients to produce compressed data, wherein compressing the coefficients further comprises:
selecting a subset of the coefficients for compressing based on values of the coefficients;
determining bit widths for each coefficient included in the subset; and
adjusting the coefficients included in the subset to fit within the bit widths.

17. The method of claim 16, wherein adjusting the coefficients further comprises mapping values of the coefficients to a predetermined range corresponding to each coefficient.

18. An image data compression block comprising:
a pixel grouping block, wherein the pixel grouping block receives image data that includes a plurality of pixels and groups the pixels into a plurality of pixel sets of a predetermined size;
a transform block operably coupled to the pixel grouping block, wherein the transform block receives a pixel set and performs a discrete cosine transformation of the pixel set to produce a transform data set, wherein the transform data set includes a plurality of coefficients; and
a compression block operably coupled to the transform block, wherein the compression block compresses at least a portion of the transform set to produce a compressed data set, wherein the compression block further comprises:
a mapping block operably coupled to the transform block, wherein the mapping blocks maps each coefficient of the plurality of coefficients to a predetermined range corresponding to each coefficient to produce mapped coefficients;
coefficient selection block operably coupled to the transform block, wherein the coefficient selection block determines selected coefficients from the plurality of coefficients; and
a packing block operably coupled to the mapping block and the coefficient selection block, wherein the packing block packs the mapped coefficients corresponding to the selected coefficients to produce the compressed data set, wherein the packing block includes a compressed coefficient identifier in the compressed data set, wherein the compressed coefficient identifier identifies the selected coefficients represented in the compressed data set.

19. The image data compression block of claim 18, wherein the compression block further comprises a packing configuration block operably coupled to the coefficient selection block and the packing block, wherein the packing configuration block determines a bit quantity to include in the compressed data set for each of the selected coefficients, wherein the determination is based on the selected coefficients, wherein the packing block performs the packing of the compressed data set based on the bit quantity for each of the selected coefficients.

20. The image data compression block of claim 19, wherein the mapping block further comprises a multiplier, wherein the multiplier multiplies each coefficient by a mapping multiplier corresponding to the coefficient to produce a mapped coefficient.

21. The image data compression block of claim 19, wherein the mapping block further comprises a lookup block, wherein the lookup block stores mapped values within the predetermined range for each coefficient and provides a mapped value as one of the mapped coefficients in response to a received coefficients received from the transform block.

22. The image data compression block of claim 19, wherein the mapping block further comprises a companding block, wherein the companding block produces the mapped coefficients from received coefficients based on companding functions corresponding to each of the coefficients.

23. The image data compression block of claim 19, wherein the compression block further comprises:
a shifting block operably coupled to the mapping block, wherein the shifting block shifts mapped coefficients such that lower order bits are shifted into higher order bit locations to produce shifted mapped coefficients; and
a truncation block operably coupled to the shifting block, the packing configuration block, and the packing block, wherein the truncation block truncates the shifted mapped coefficients based on bit quantities determined by the packing configuration block to produce truncated coefficients; and
wherein the packing block packs the truncated coefficients with the compressed coefficient identifier to produce the compressed data set.

24. The image data compression block of claim 23, wherein the truncation block rounds the shifted mapped coefficients prior to truncation.

25. The image data compression block of claim 23, wherein the compression block further comprises a clip monitor block operably coupled to the truncation block, the mapping block, the shifting block, and the packing configuration block, wherein the clip monitor block adjusts packing parameters based on clip occurrences in the truncated coefficients.

26. An integrated video data circuit, comprising:
at least one memory client, wherein the at least one memory client performs at least one of reading operations and writing operations, wherein the reading operations retrieve video data from a memory, wherein writing operation stores video data in the memory;
a memory controller operably coupled to the at least one memory client and adapted to couple to the memory, wherein the memory controller includes a compression block and a decompression block, wherein the compression block receives video data for writing operations and compresses the video data to produce compressed video data for storage in the memory, wherein the decompression block fetches compressed video data from the memory and decompresses the compressed video data to produce video data provided to the at least one memory client in response to reading operations; and wherein the memory controller
determines a coefficient set, wherein the coefficient set indicates which of transform coefficients are represented in the compressed data set;
compresses values corresponding to coefficients included in the coefficient set to produce compressed coefficients; and
combines the compressed coefficients to produce the compressed data set;
wherein the compression block of the memory controller further comprises:
a pixel grouping block, wherein the pixel grouping block receives video data for writing operations that includes a plurality of pixels and groups the pixels into a plurality of pixel sets of a predetermined size;
a transform block operably coupled to the pixel grouping block, wherein the transform block receives a pixel set and performs a discrete cosine transformation of the pixel set to produce a transform data set, wherein the transform data set includes a plurality of coefficients;
a mapping block operably coupled to the transform block, wherein the mapping block maps each coefficient of the plurality of coefficients to a predetermined range corresponding to each coefficient to produce mapped coefficients;
a coefficient selection block operably coupled to the transform block, wherein the coefficient selection block determines selected coefficients from the plurality of coefficients; and
a packing block operably coupled to the mapping block and the coefficient selection block, wherein the packing block packs the mapped coefficients corresponding to the selected coefficients to produce compressed video data, wherein the packing block includes a compressed coefficient identifier in the compressed video data, wherein the compressed coefficient identifier identifies the selected coefficients represented in the compressed video data.

27. The video data circuit of claim 26, wherein the decompression block further comprises:
an unpacking block, wherein the unpacking block receives the compressed data from the memory, wherein the unpacking block separates the compressed coefficients based on the coefficient identifier to produce the mapped coefficients;
an inverse mapping block operably coupled to the unpacking block, wherein the inverse mapping block maps the mapped coefficients based on an inverse mapping function to produce the plurality of coefficients; and
an inverse discrete cosine transform block operably coupled to the inverse mapping block, wherein the inverse discrete cosine transform block performs an inverse cosine transform on the plurality of coefficients to produce the pixel set.

28. The video data circuit of claim 26, wherein the at least one memory client includes an image processor.

29. The video data circuit of claim 28, wherein the image processor processes MPEG image data.

30. The video data circuit of claim 29, wherein the image processor receives an MPEG data stream, wherein the image processor combines data in the MPEG data stream with data retrieved via the memory controller to produce images, wherein data from at least a portion of the images is stored in the memory via write operations.

31. An image data storage processor, comprising:
a processing module; and
memory operably coupled to the processing module, wherein the memory includes operating instructions that cause the processing module to:
separate the image data into a plurality of pixel sets, wherein each pixel set is a predetermined pixel set size; and
for each pixel set of the plurality of pixel sets:
perform a discrete cosine transformation of the pixel to set to produce a plurality of transform coefficients; and
compress the transform coefficients for the pixel set to produce a compressed data set, wherein the compressed data set is a predetermined compressed data set size, wherein the compressed data set size is less than the pixel set size; and
determine a coefficient set, wherein the coefficient set indicates which of the transform coefficients are represented in the compressed data set;
compress values corresponding to coefficients included in the coefficient set to produce compressed coefficients; and
combine the compressed coefficients to produce the compressed data set.

32. The image data storage processor of claim 31, wherein the memory further comprises operating instructions that cause the processing module to:
combine the compressed coefficients with a compressed coefficient identifier to produce the compressed set, wherein the compressed coefficient identifier identifies the transform coefficients represented in the compressed set.

33. The image data storage processor of claim 32, wherein the compressed coefficient identifier is an N-bit identifier, wherein N is a number, wherein the N-bit identifier identifies a highest order coefficient in a ($2^N$) range of coefficients, wherein the highest order coefficient and lower order coefficients are included in the coefficient set.

34. The image data storage processor of claim 32, wherein the memory further comprises instructions such that the processing module compresses values by:
mapping a value of the coefficient to a predetermined range for the coefficient to produce a mapped value, wherein when a bit width of a compressed coefficient corresponding to the coefficient is equal to a bit width of the mapped value for the coefficient, the mapped value is the compressed coefficient for the coefficient; and
when the bit width of the compressed coefficient corresponding to the coefficient is less than the bit width of the mapped value for the coefficient, discarding a discard quantity of low order bits of the mapped value to produce the compressed coefficient for the coefficient, wherein the discard quantity is equal to a difference between the bit width of the mapped value for the coefficient and the bit width for the compressed coefficient.

35. The image data storage processor of claim 34, wherein the memory further comprises operating instructions such that the processing module maps each value to a predetermined range that corresponds to a power of two such that a set of range bits can be used to represent the mapped value.

36. The image data storage processor of claim 34, wherein the memory further comprises operating instructions such that the processing module maps the value of the coefficient by a mapping multiplier to produce a mapped value within the predetermined range.

37. The image data storage processor of claim 34, wherein the memory further comprises operating instructions such that the processing module maps the value of the coefficient by utilizing a look up function to produce the mapped value from the value of the coefficient.

38. The image data storage processor of claim 34, wherein the memory further comprises operating instructions such that the processing module maps the value of the coefficient by performing a compand operation on the value of the coefficient to produce the mapped value for the coefficient.

39. The image data storage processor of claim 34, wherein the memory further comprises operating instructions such that the processing module discards low order bits of the mapped value by:
  shifting the mapped value such that lower order bits are shifted into higher order bit locations to produce a shifted mapped value; and
  discarding the discard quantity of low order bits of the shifted mapped value.

40. The image data storage processor of claim 39, wherein the memory further comprises operating instructions such that the processing module determines the discard quantity for each compressed coefficient from a selected table, wherein the selected table is selected from a plurality of tables corresponding to a plurality of potential coefficient sets.

41. The image data storage processor of claim 38, wherein the memory further comprises operating instructions such that the processing module determines the coefficient set by:
  comparing values of the transform coefficients with threshold values; and
  including in the coefficient set transform coefficients whose values exceed corresponding threshold values.

42. The image data storage processor of claim 41, wherein the memory further comprises operating instructions such that the processing module compares values of the transform coefficients by:
  comparing values of a predetermined portion of the transform coefficients with the threshold values;
  including a highest order coefficient that exceeds a corresponding threshold value in the coefficient set; and
  including coefficients of a lower order as compared to the highest order coefficient in the coefficient set.

43. The image data storage processor of claim 31, wherein the image data is MPEG video data.

44. The image data storage processor of claim 31, wherein the memory further comprises operation instruction such that the processing module separates the image data into a plurality of 8-by-1 pixel sets, wherein each 8-by-1 pixel set includes eight consecutive horizontal pixels.

45. The image data processor of claim 31, wherein the pixels set size is twice as large as the compressed data set size.

* * * * *